(12) United States Patent
Rhee

(10) Patent No.: US 6,361,460 B1
(45) Date of Patent: Mar. 26, 2002

(54) DEVICE FOR DRIVING A SPROCKET OF A BICYCLE

(76) Inventor: Jae Wha Rhee, 2-1109 Sam-poong Apartment, Seocho-dong 1685, Seocho-gu, Seoul (KR)

( * ) Notice: Subject to any disclaimer, the term of this patent is extended or adjusted under 35 U.S.C. 154(b) by 0 days.

(21) Appl. No.: 09/468,765

(22) Filed: Dec. 21, 1999

(30) Foreign Application Priority Data

Dec. 22, 1998 (KR) ............................................ 98-57126

(51) Int. Cl.[7] ............................................ F16H 55/30
(52) U.S. Cl. ........................ 474/152; 474/160; 464/62; 464/81
(58) Field of Search ................................ 474/144, 145, 474/151, 152, 153, 156, 160, 161, 202; 74/594.3, 594.2; 280/212, 214, 215; 464/62, 81, 160

(56) References Cited

U.S. PATENT DOCUMENTS

| 608,770 A | * | 9/1898 | Godfray | 474/94 |
| 1,254,542 A | * | 1/1918 | Schwinn | 464/67 |
| 5,035,678 A | * | 7/1991 | Hageman | 474/50 |
| 5,560,266 A | * | 10/1996 | Shikimori et al. | 74/594.1 |

* cited by examiner

Primary Examiner—David A. Bucci
Assistant Examiner—Vicky A. Johnson
(74) Attorney, Agent, or Firm—William J. Sapone; Coleman Sudol Sapone P.C.

(57) ABSTRACT

The present invention relates to a device for driving a sprocket of a bicycle, which enables a rider to easily rotate both pedals even with little force when both cranks of the pedal are vertically positioned. According to the present invention, when a crank (11) gets to be vertically positioned by rotating the pedals (11a), a guide pin (21) projected from a rotating plate (20) draws a tensile spring (41) from the guide groove (31) and thereby the rotating plate (20) gets to be elastically rotated so the crank (11) can go off the vertical position rapidly. Accordingly, the rider can easily rotate the pedals, and at the same time, the force of restitution of the drawn tension spring (41) can help the sprocket (10) be rotated. Consequently, the accumulated force of the tensile spring (41) accelerates the rotation of the sprocket (10) to enable the crank (11) to go off the vertical position effectively, which in turn enables the rider to drive the bicycle with ease.

2 Claims, 8 Drawing Sheets

DEVICE FOR DRIVING A SPROCKET OF A BICYCLE

TECHNICAL FIELD

The present invention relates to a device for driving a sprocket of a bicycle, which enables a rider to easily rotate two pedals thereof even with little force particularly when the cranks of the pedals are vertically positioned.

BACKGROUND

Generally, a bicycle has a larger sprocket with two pedals installed axially thereon and a smaller sprocket mounted on its rear wheel with the two sprockets being connected to each other by a chain. Its running system is that as the rider rotates the pedals, the power of the pedals is transferred to the rear wheel by the chain to get the bicycle to run.

Accordingly, if the rider steps on two pedals mounted on both sides of the larger sprocket alternately, the larger sprocket is supposed to be rotated simultaneously as the pedals are rotated.

When stepping on the said pedals alternately, the rider steps on them with ease when the cranks of the pedals are horizontally positioned. But, when the said cranks are vertically positioned, the pedals get to be positioned on the top dead center where the bending moment becomes least and consequently, the rider gets to step on the pedals in a very uncomfortable posture.

In such an uncomfortable posture, it is very difficult for the rider to use a large force so that he has much difficulty in rotating the pedals. The only way to overcome the difficulty when the cranks are vertically positioned is to use the inertial force generated as the pedals are rotated. However, in case the inertial force is not used, it is very difficult to get the bicycle to run.

SUMMARY OF THE INVENTION

The object of the present invention is to solve the above problems by providing a device for driving a sprocket of a bicycle which enables a rider to rotate two pedals thereof with ease even with a little force when the cranks of the said pedals are vertically positioned.

To achieve this object, the present invention provides a device for driving a sprocket of a bicycle, which is characterized by the system that while both cranks and both pedals are mounted on both side of an axis penetrating into the center of a sprocket of a bicycle, a circular hole is provided in the center of the sprocket so that a rotating plate with both cranks installed axially thereon may be inserted into the hole, the rotating plate supported by a cover plate fixed to the outer face of the sprocket so that it may be rotated; and further the rotating plate is supported by an elastic body so that it may be elastically rotated within a certain radius.

DETAILED DESCRIPTION OF THE INVENTION

Figure 1A:
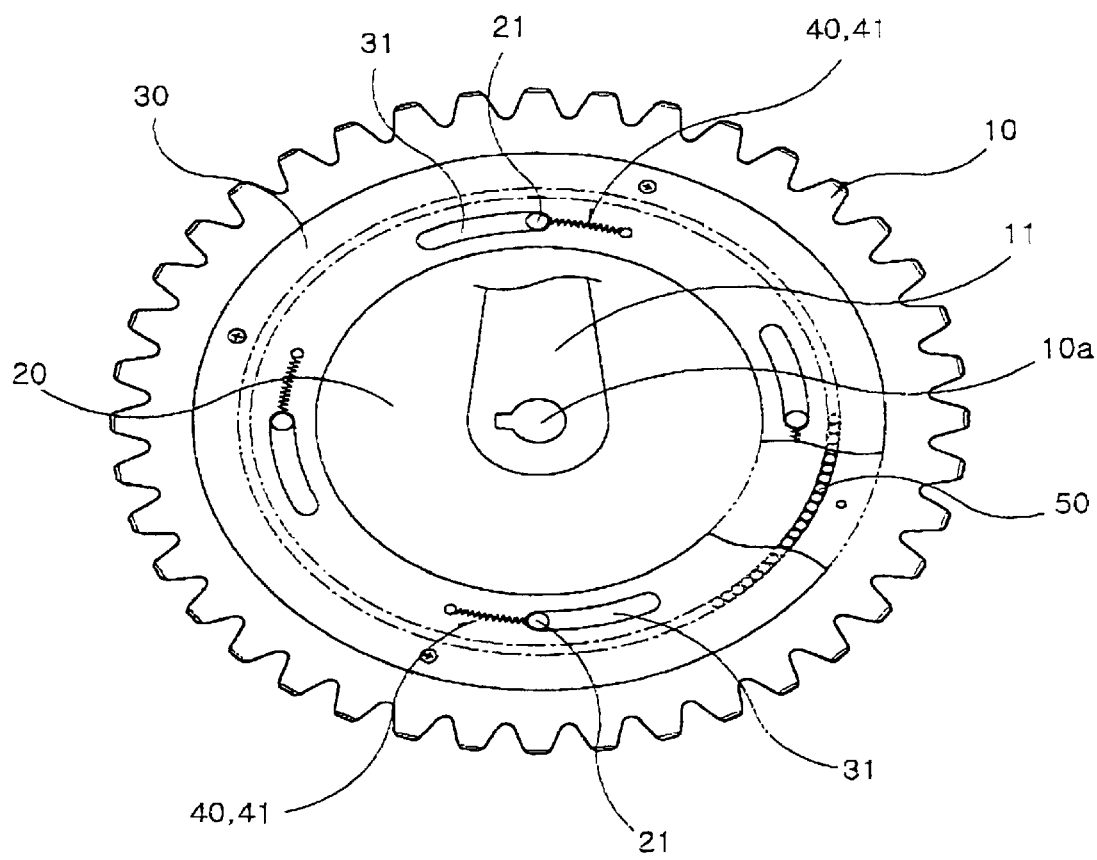
FIGS. 1a and 1b are operational views showing a preferred embodiment of the present invention.

| List of Referenced Parts: | | | |
|---|---|---|---|
| 1 | bicycle | 10 | sprocket |
| 10a | axis | 11 | crank |
| 11a | pedal | 12 | guide groove |
| 20 | rotating plate | 21 | guide pin |
| 22 | pressure crena | 30 | cover plate |
| 31 | guide groove | 40 | elastic body |
| 41 | tensile spring | 42 | compression spring |
| 43 | plate spring | 50 | ball-bearing |

The preferred embodiments of the present invention are described below in detail in conjunction with the attached drawings.

As shown in FIGS. 1 to 5, a crank (11) and a pedal (11a) are mounted on each side of an axis (10a) penetrating into a center of a sprocket (10) of a bicycle (1). Of course, such a bicycle is known to the public.

The most important feature of the present invention is that a rotating plate (20) is inserted into a circular hole in the center of the sprocket (10) so that it is elastically supported by an elastic body (40).

In other words, a circular hole is formed in the center of the sprocket (10), and the rotating plate (20), which is made of a disc, is inserted into the hole.

The rotating plate (20) is stably mounted and supported by the cover plate (30) fixed to the outer face of the sprocket (10) so that it may be rotated. The rotating plate (20) is of a structure that it is also elastically supported by the elastic body (40) so that it may be rotated by the force of restitution of the elastic body (40) within a certain angular range.

According to a preferred embodiment shown in FIG. 1a, a plural number of curved guide grooves (31) are formed on the outer face of the cover plate (30) so that guide pins (21), projected on the outer face of the sprocket, are inserted into the guide grooves. The guide pins (21) are supposed to be elastically drawn by the elastic body (4) comprising the tensile spring (41).

Of course, naturally, one end of the tensile spring (41) is fixed to the cover plate (30) and the other end thereof is fixed to the guide pin (21) so that the guide pin (21) may be drawn by the tensile spring (41).

Further ball-bearings (50) are inserted between the outer face of the rotating plate (20) and the sprocket (10) so that the rotating plate (20) may be smoothly rotated.

According to the present invention of the above described construction, as shown in FIG. 1a, when the crank (11) is vertically positioned in the course of getting the bicycle (1) to run by rotating the pedal (11a) and consequently the rider gets to be in such an uncomfortable posture as to have difficulty in rotating the crank (11), the rotating plate (2), where the crank (11) is mounted, gets to be rotated within a certain angular range even though the rider steps on the pedal with a little force, and thereby the crank (11) can go off the vertical position so the rider can rotate the pedal (11a) with ease.

Figure 1B:
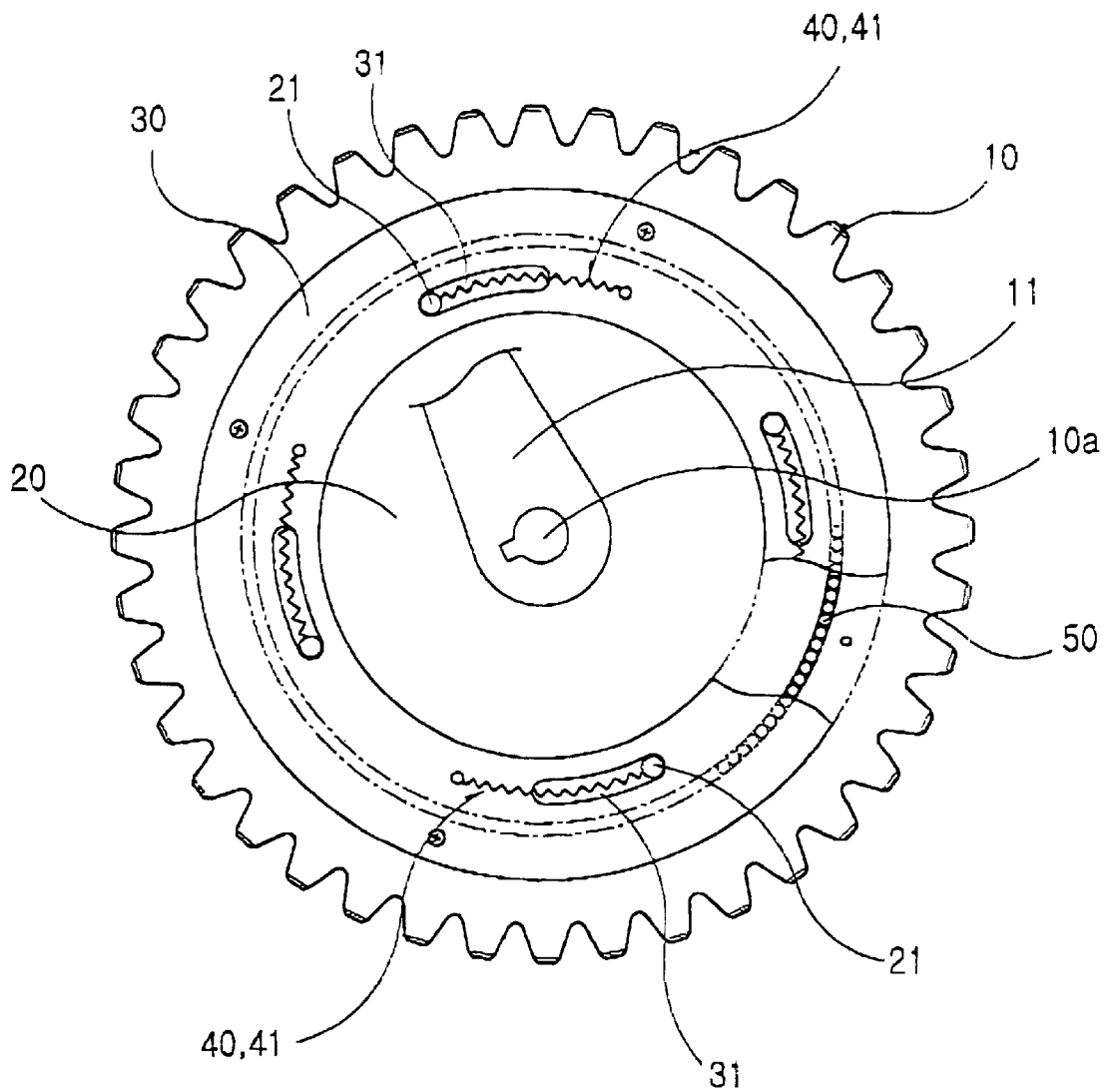
Figure 2:
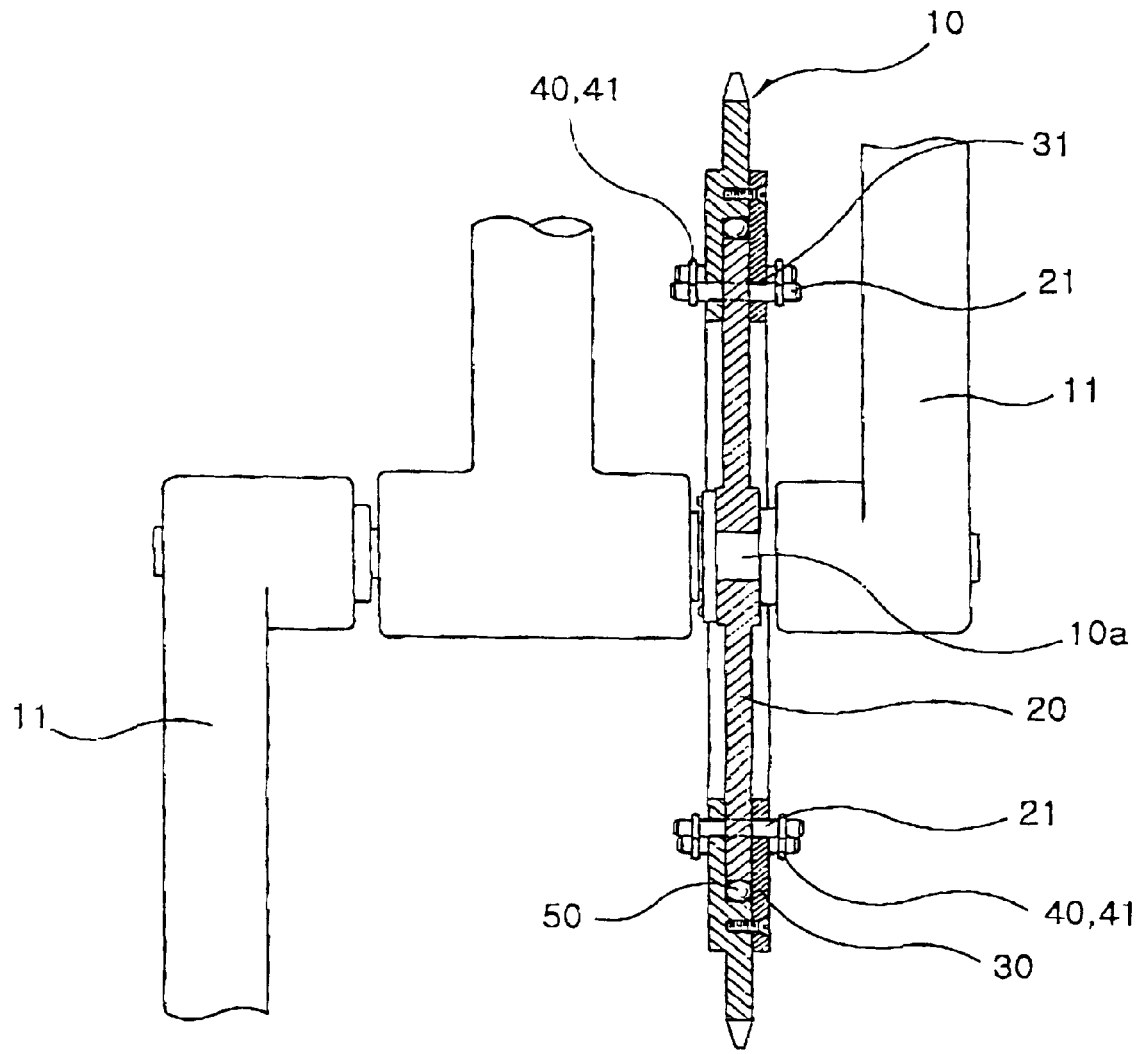
FIG. 2 is a sectioned view of FIG. 1.

Meanwhile, as the guide pin (21) projected on the rotating plate (20) draws the tensile spring (41) from the guide groove (31) on the cover plate (30), it moves until it stops as shown in FIG. 1b. Therefore, only with a force enabling the elasticity of the tensile spring (41) to be restored, the rotating plate (20) gets to be rotated within the range of the guide groove (31) so the crank (11) can go off the vertical position.

As shown in FIG. 1b, if the crank (11) is vertically positioned while the tensile spring (41) is drawn, the force of restitution of the drawn tensile spring (41) can supplement the force to rotate the sprocket (10). Consequently, the accumulated force of the tensile spring (41) is effectively used to enable the crank (11) to go off the vertical position.

Of course, the length of the guide groove (31) and/or the force of the tensile spring (41) can be properly adjusted to form a different tensile strength thereof suitable for each rider, providing an advantage to enable the rider to drive the bicycle (1) with ease.

Figure 3Q:
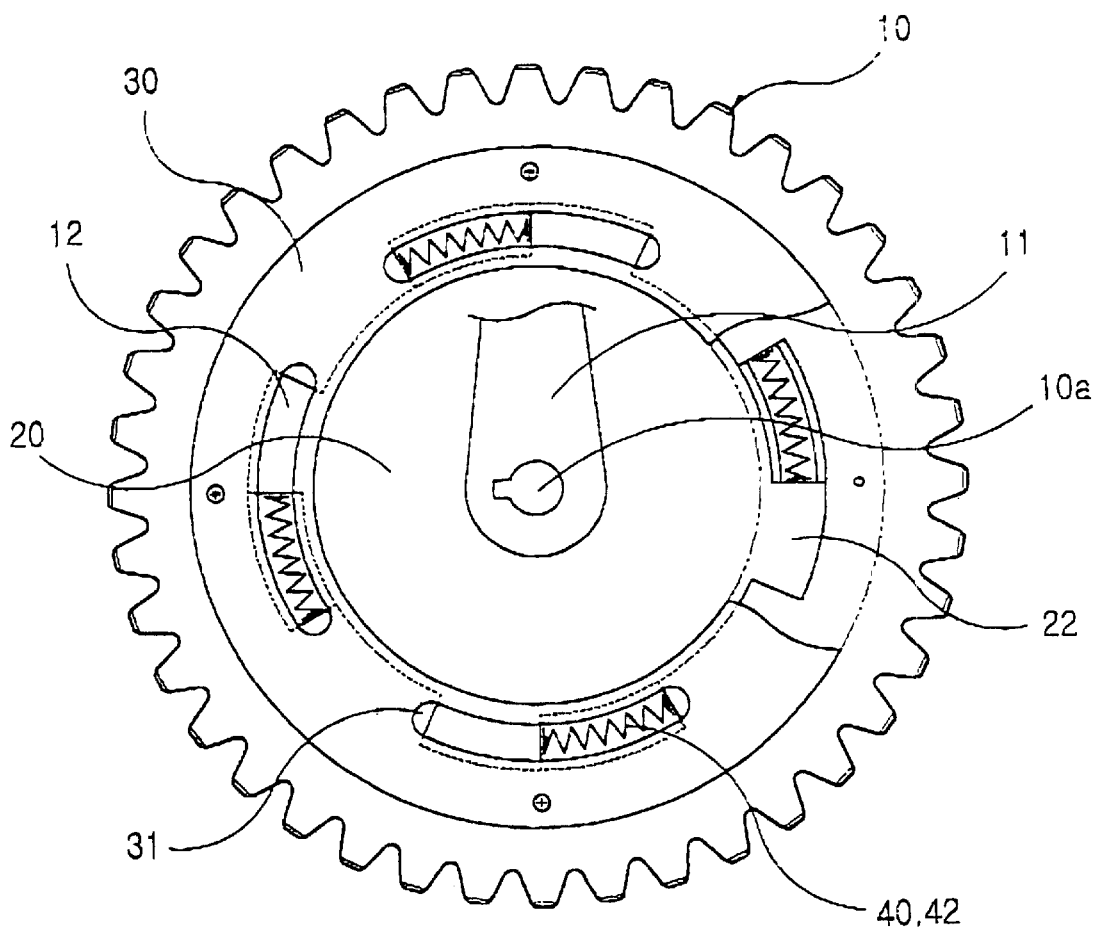
FIGS. 3a and 3b are operational views showing another preferred embodiment of the present invention.
Figure 3B:
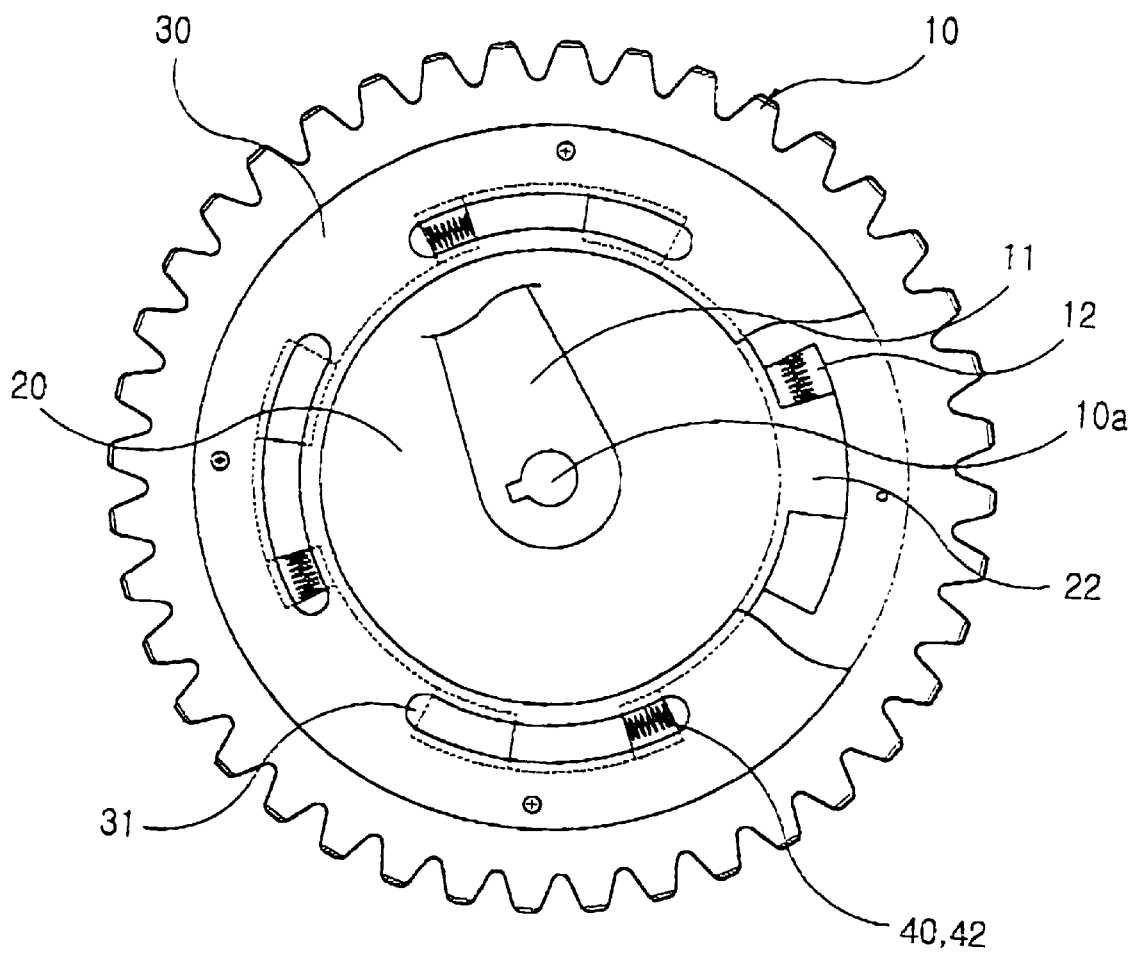

According to another embodiment shown in FIGS. 3a and 3b, a plural number of guide grooves (12) are formed on the circumference of the circular hole in the center of the sprocket (10), and pressure crenas (22) projected on the circumference of the rotating plate (20) are inserted into the guide grooves (12) so that the sprocket may be elastically supported by the elastic body (40) comprising the compression spring (42).

According to this embodiment, when the crank (11) is vertically positioned so it is difficult to get the crank (11) to be rotated, even with a little force, the pressure crenas (22) projected on the rotating plate (20) compress the compression spring (42) in the guide groove (12) of the sprocket (10) and thereby, the rotating plate (20) gets to be rotated until it stops as shown in FIG. 3b. Therefore, only with a force getting the elasticity of the compression spring (42) to be restored, the rotating plate (20) gets to be rotated within the range of the guide groove (12) and thereby, the crank (11) can go off the vertical state.

Figure 4A:
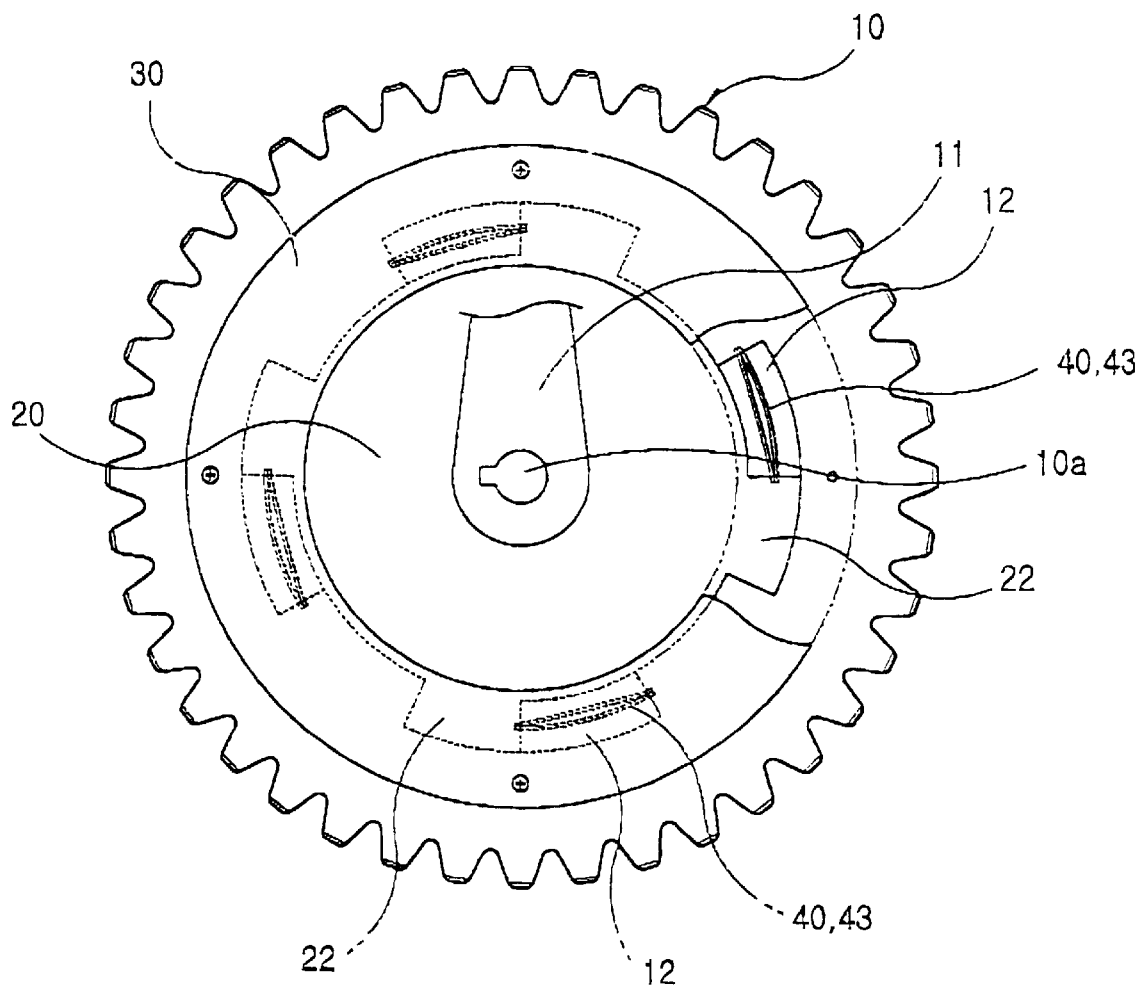
FIGS. 4a and 4b are operational views showing another preferred embodiment of the present invention.
Figure 4B:
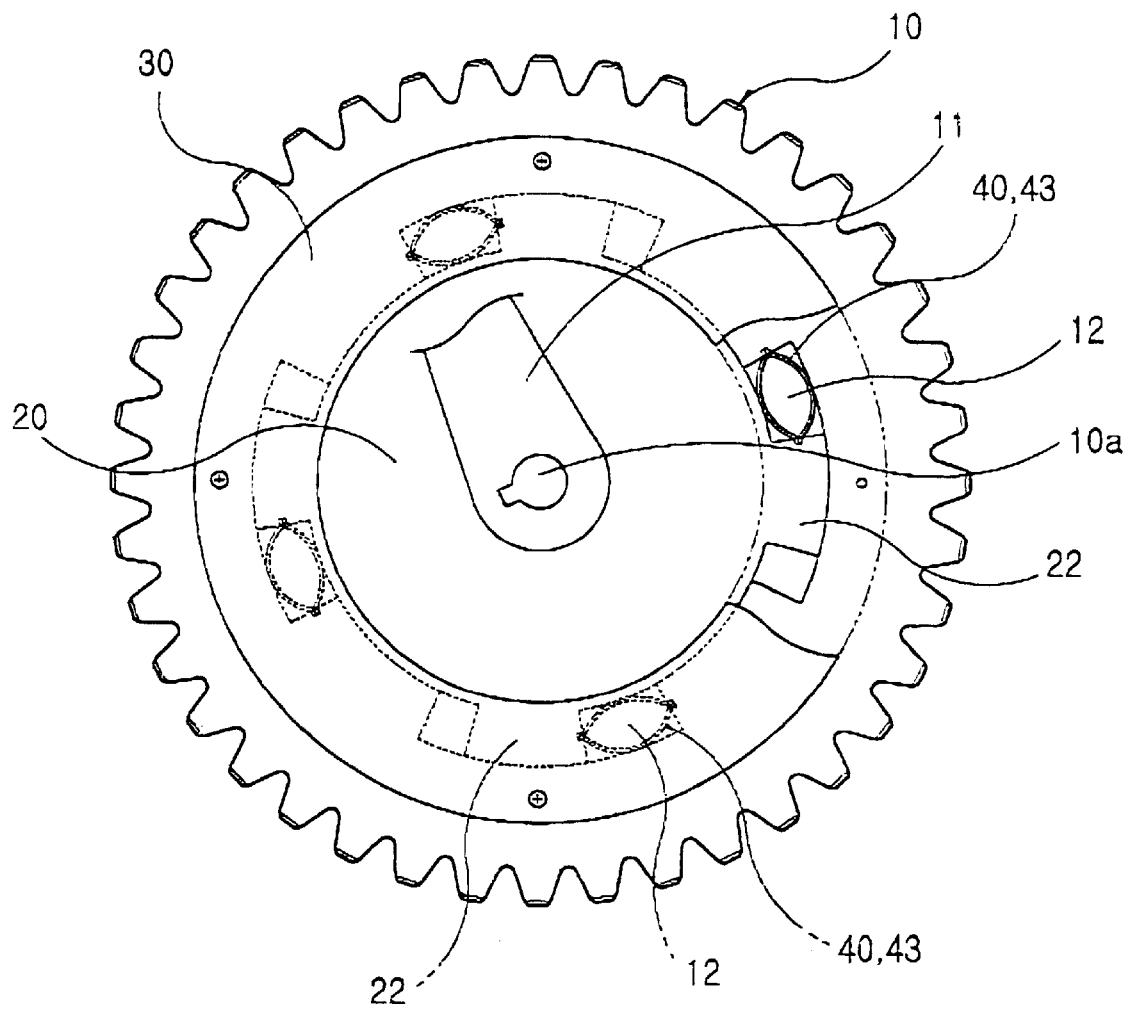
Figure 5:
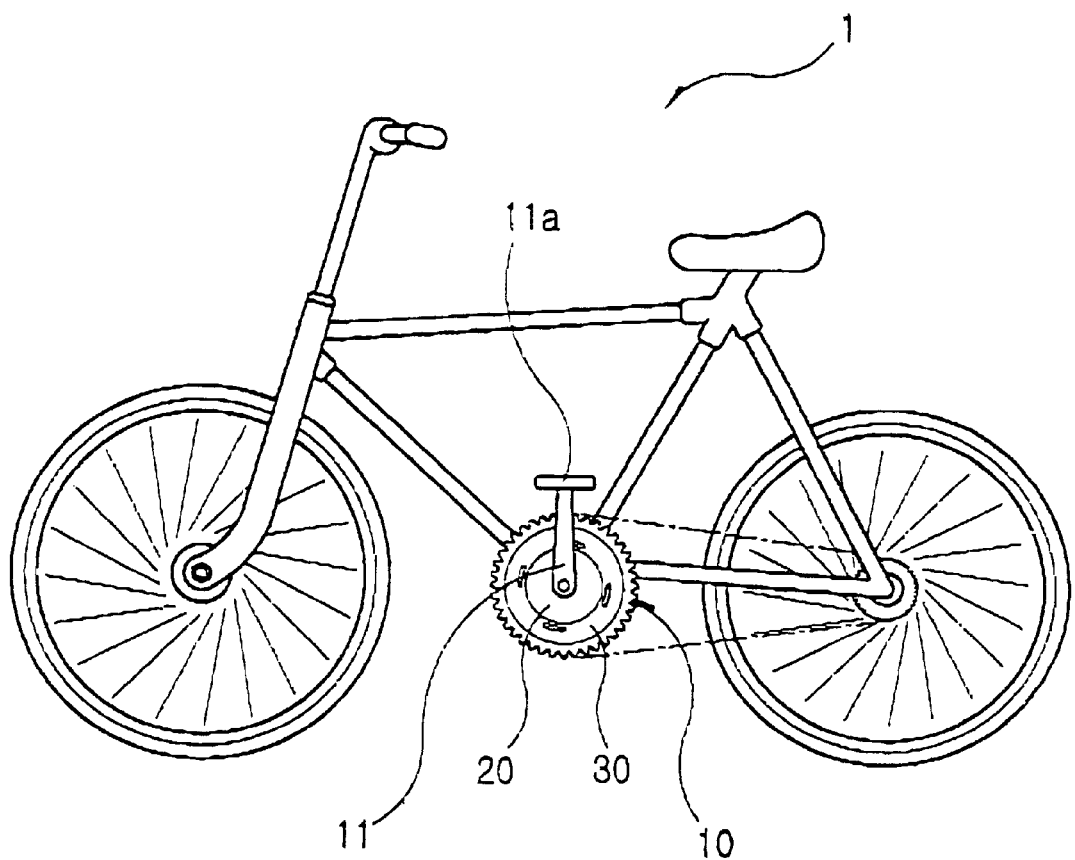
FIG. 5 is a working view showing an example of the prevent invention installed in a bicycle.

Also, according to another embodiment shown in FIGS. 4a and 4b, an elastic body (40) comprising a plate spring (43) can be inserted between the guide groove (12) of the sprocket (10) and the pressure crenas (22) of the rotating plate (20).

Even in this case, if the pressure crena puts only a force getting the elasticity of the plate spring (43) to be restored, the rotating plate (20) gets to be rotated within the range of the guide groove (12), and thereby the crank (11) can go off the vertical position.

Accordingly, the present invention is not limited to one kind of elastic body (40), but a variety of elastic bodies (40) are applicable to this invention.

Besides, the sprocket driving device of the present invention is not limited to only the ordinary bicycles used by general public, but it is widely applicable to the professional cycles for a sport game. So, the device is very useful for cycle racers.

According to the present invention as described above, when the crank (11) gets to be vertically positioned in the course of getting the bicycle (1) to run by rotating the pedals (11a), the guide pin (21) projected from the rotating plate (20) draws the tensile spring (41) from the guide groove (31) and thereby the rotating plate (20) gets to be elastically rotated so the crank (11) can go off the vertical position rapidly. Accordingly, the rider can easily rotate pedals (11a), and at the same time, when the crank (11) gets to be vertically positioned during rotation thereof while the tensile spring (41) is drawn, the force of restitution of the drawn tension spring (41) can help the sprocket (10) be rotated. Consequently, the accumulated force of the tensile spring (41) accelerates the rotation of the sprocket (10) to enable the crank (11) to go off the vertical position effectively, which in turn enables the rider to drive the bicycle with ease.

While preferred embodiments have been shown and described, it will be understood by those skilled in the art that various changes or modifications can be made without varying from the scope of the present invention.

What is claimed is:

1. A device for driving a sprocket of a bicycle, characterized by having both cranks and both pedals mounted on both side of an axis penetrating into a center of a sprocket of a bicycle; a circular hole provided in the center of the sprocket so that a rotating plate with both cranks installed axially thereon is inserted into the hole; the rotating plate supported by a cover plate fixed to an outer face of the sprocket so that it can be rotated; the rotating plate supported by an elastic body so that the rotating plate can be elastically rotated within a certain radius, a plural number of guide grooves formed on a circumference of the circular hole in the center of the sprocket, pressure crenas projected on the circumference of the rotating plate and inserted into the guide grooves, so the sprocket is elastically supported by the elastic body which comprises a plate spring inserted between the guide groove of the sprocket and the pressure crenas of the rotating plate.

2. The device of claim 1, wherein a plural number of curved guide grooves are formed on the outer face of the cover plate, and guide pins projected on the outer face of the sprocket are inserted into the guide grooves and the guide pins are elastically drawn by the elastic body which comprises a tensile spring.

* * * * *